(12) United States Patent
Chen et al.

(10) Patent No.: US 6,809,749 B1
(45) Date of Patent: Oct. 26, 2004

(54) METHOD AND APPARATUS FOR CONDUCTING AN INTERACTIVE DESIGN CONFERENCE OVER THE INTERNET

(75) Inventors: Tsung-Yen Chen, Fremont, CA (US); Ke-Qin Gu, San Jose, CA (US); Ching-Chih Han, Fremont, CA (US); Kuo-Chun Lee, Fremont, CA (US)

(73) Assignee: Oridus, Inc., Fremont, CA (US)

( * ) Notice: Subject to any disclaimer, the term of this patent is extended or adjusted under 35 U.S.C. 154(b) by 0 days.

(21) Appl. No.: 09/563,658

(22) Filed: May 2, 2000

(51) Int. Cl.$^7$ .............................................. G06F 13/00
(52) U.S. Cl. ...................................... 345/753; 345/854
(58) Field of Search ................................ 315/733, 738, 315/751, 758, 753, 741, 742, 760, 804, 854; 709/201, 202, 218

(56) References Cited

U.S. PATENT DOCUMENTS

| | | | |
|---|---|---|---|
| 5,710,918 A | | 1/1998 | Lagarde et al. |
| 5,793,365 A | * | 8/1998 | Tang et al. ................... 345/762 |
| 5,793,964 A | | 8/1998 | Rogers et al. |
| 5,815,683 A | | 9/1998 | Vogler |
| 5,822,525 A | | 10/1998 | Tafoya et al. |
| 5,838,906 A | | 11/1998 | Doyle et al. |
| 5,850,517 A | | 12/1998 | Verkler et al. |
| 5,861,883 A | | 1/1999 | Cuomo et al. |
| 5,864,711 A | | 1/1999 | Mairs et al. |
| 5,874,960 A | | 2/1999 | Mairs et al. |
| 5,907,324 A | * | 5/1999 | Larson et al. ................ 345/763 |
| 5,920,865 A | | 7/1999 | Ariga |
| 5,925,103 A | | 7/1999 | Magallanes et al. |
| 5,928,324 A | | 7/1999 | Sloan |
| 5,940,082 A | | 8/1999 | Brinegar et al. |
| 5,944,784 A | | 8/1999 | Simonoff et al. |
| 5,949,975 A | | 9/1999 | Batty et al. |
| 5,974,446 A | | 10/1999 | Sonnenreich et al. |
| 5,991,796 A | | 11/1999 | Anupam et al. |
| 6,032,188 A | | 2/2000 | Mairs et al. |
| 6,058,395 A | | 5/2000 | Buzaglo et al. |
| 6,078,948 A | | 6/2000 | Podgorny et al. |
| 6,119,147 A | | 9/2000 | Toomey et al. |
| 6,144,991 A | * | 11/2000 | England ...................... 709/205 |
| 6,151,621 A | * | 11/2000 | Colyer et al. ................ 709/204 |
| 6,167,432 A | | 12/2000 | Jiang |
| 6,181,689 B1 | | 1/2001 | Choung et al. |
| 6,199,116 B1 | | 3/2001 | May et al. |
| 6,237,025 B1 | | 5/2001 | Ludwig et al. |
| 6,256,663 B1 | | 7/2001 | Davis |
| 6,263,365 B1 | | 7/2001 | Scherpbier |
| 6,289,461 B1 | | 9/2001 | Dixon |
| 6,331,861 B1 | * | 12/2001 | Gever et al. ................. 345/629 |
| 6,338,086 B1 | | 1/2002 | Curtis et al. |
| 6,433,795 B1 | * | 8/2002 | MacNaughton et al. .... 345/738 |
| 6,570,590 B1 | | 5/2003 | Dubrow et al. |
| 6,574,674 B1 | | 6/2003 | Mairs et al. |
| 6,584,493 B1 | | 6/2003 | Butler |

OTHER PUBLICATIONS

ITU–T Recommendation T.128, "Multipoint application sharing," (Feb. 1998).
Coward, Robert.; Mastering Windows 98; 1998; Sybex; Chapter 19.
DataBeam Corporatioj, "A Primer on the T.120 Series Standard," 1995.

* cited by examiner

Primary Examiner—Cao (Kevin) Nguyen
(74) Attorney, Agent, or Firm—Victor H. Okumoto

(57) ABSTRACT

A method of conducting an interactive design conference over the Internet, comprises: selectively admitting clients communicating through web browsers over the Internet to an interactive design conference; receiving a graphics file indicative of a design from one of the clients; and transmitting the graphics file to the other clients so as to be viewable as a graphics image through graphics file readers in the client web browsers. The graphics file is generated by a snapshot program previously transmitted to a client initiating the design conference and controlling the design database. Java applets are transmitted to each of the design conference participants to facilitate communicating annotations of the graphics image and messages between clients through their web browsers.

22 Claims, 6 Drawing Sheets

US 6,809,749 B1

METHOD AND APPARATUS FOR CONDUCTING AN INTERACTIVE DESIGN CONFERENCE OVER THE INTERNET

FIELD OF THE INVENTION

The present invention generally relates to methods of conducting collaboration sessions over the Internet and in particular, to a method and apparatus for conducting an interactive design conference over the Internet.

BACKGROUND OF THE INVENTION

The Internet provides an ideal medium in which clients scattered around the world can interactively conduct a design collaboration session or conference in a cost effective manner. One problem with certain conventional methods of conducting design conferences, however, is that each client participating in the conference needs to run the same application program in order to view shared files. Another problem is that the application program generally needs to be run on the same platform. Still another problem is that shared files tend to be large and require considerable transmission time.

OBJECTS AND SUMMARY OF THE INVENTION

Accordingly, it is an object of the present invention to provide a method and apparatus for conducting an interactive design conference over the Internet that does not require each client participating in the conference to run the same application program in order to view shared files.

Another object is to provide a method and apparatus for conducting an interactive design conference over the Internet that is platform independent.

Still another object is to provide a method and apparatus for conducting an interactive design conference over the Internet that minimizes the size and transmission time for shared files.

These and additional objects are accomplished by the various aspects of the present invention, wherein briefly stated, one aspect of the invention is a method of conducting an interactive design conference over the Internet, comprising: selectively admitting clients communicating through web browsers over the Internet to an interactive design conference; receiving a graphics file indicative of a design from one of the clients; and transmitting the graphics file to all of the clients so as to be viewable as a graphics image through graphics file readers in the web browsers.

In another aspect of the invention, an apparatus for conducting an interactive design conference over the Internet, comprises a web server programmed to establish a design conference including clients communicating through web browsers over the Internet, receive a graphics file indicative of a design from one of the clients; and transmit the graphics file to all of the clients so as to be viewable as a graphics image through graphics file readers in or invoked by the web browsers.

In yet another aspect of the invention, an apparatus for conducting an interactive application conference over the Internet, comprises a web client configured with an application page defining a display area for displaying a graphics image indicative of an application, and an annotation area for generating annotations of the graphics image; a snapshot program to generate upon command a graphics file corresponding to the graphics image, and transmit upon command the graphics file to a web server for retransmission over the Internet to other participants communicating through web browsers so as to translate the graphics file back into and display the graphics image; and a module to generate upon command annotations of the graphics image and transmit the annotations to the web server for retransmission over the Internet to the other participants configured with java applets cooperating with the web browsers so as to display the annotations over the graphics image.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENT

Figure 1:
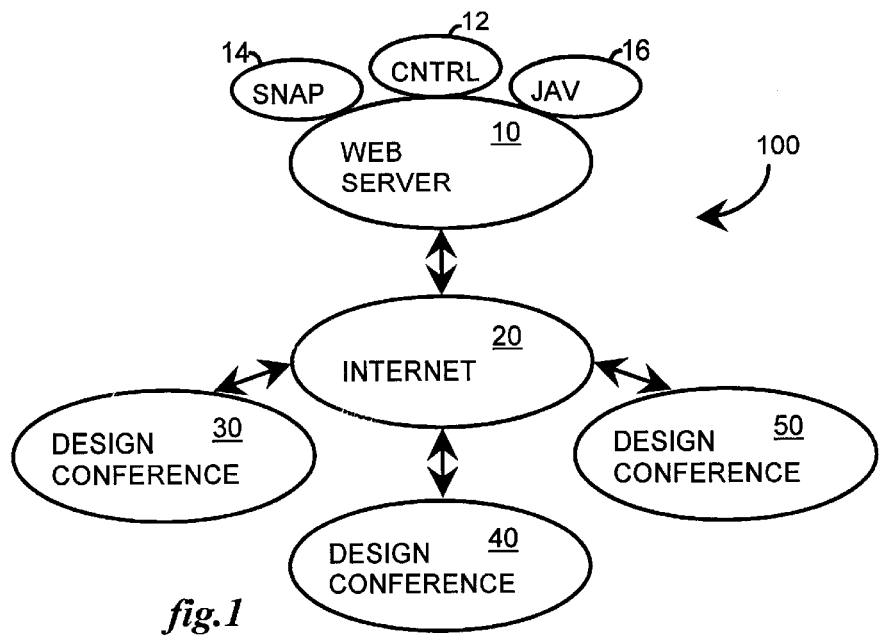
FIG. 1 illustrates a diagram of a system including an apparatus for conducting an interactive design conference over the Internet.

FIG. 1 illustrates a diagram of a system 100 including a web server 10 programmed with control program 12 to conduct or manage one or more interactive design conferences 30, 40, 50 over the Internet 20. In addition to the control program 12 and its associated databases, master copies of a snapshot program 14 and a java applet 16 also reside on the web server 10. As will be described in detail below in reference to FIGS. 2–13, a copy of the snapshot program 14 is transmitted to an initiator of each design conference, and a copy of the java applet 16 is transmitted to each participant of the design conference, including the initiator, to facilitate the interactive design conference.

Figure 2:
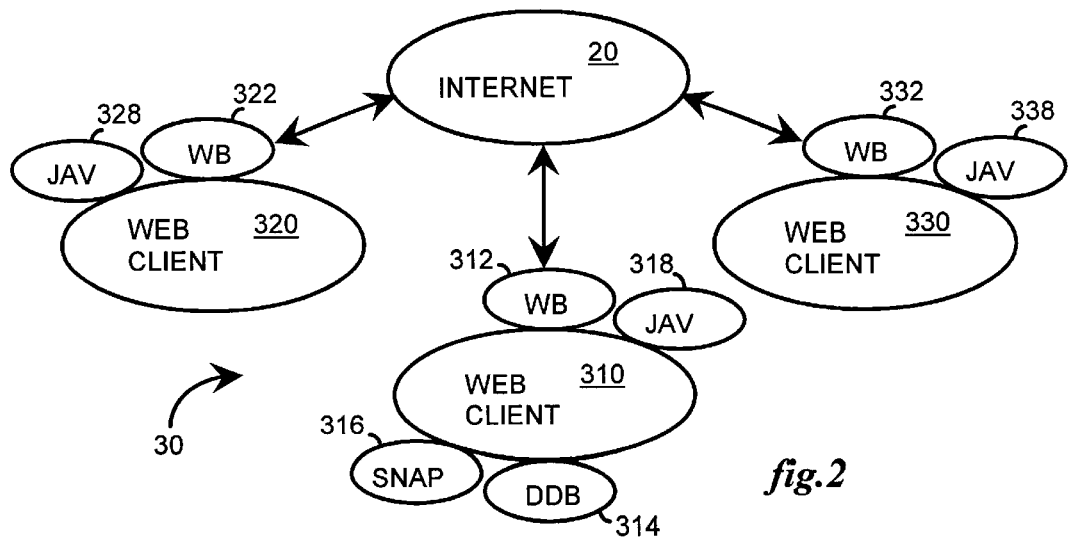
FIG. 2 illustrates a diagram further detailing an interactive design conference on the client side.

FIG. 2 illustrates a diagram further detailing representative interactive design conference 30, including web clients 310, 320, 330, communicating with web server 10 through respective web browsers 312, 322, 332 over the Internet 20. In this example, web client 310 has initiated the design conference 30 by running a copy 316 of the snapshot program 14. A design database 314 is resident on web client 310. Web client 310 selects data from the design database 314 to be presented to other web clients 320, 330 during the design conference by taking a snapshot of a window displayed on its display screen. The snapshot program 316 residing in web client 310 facilitates taking of the snapshot, conversion of the snapshot into a graphics file, and transmission of the graphics file to the web server 10. The graphics file may be in any one of a number of graphics file formats such as JPEG, GIF or TIF. The web server 10 receives the graphics file, and transmits the graphics file to all web clients 310, 320, 330 participating in the design conference.

The graphics file is indicative of a design stored in the design database 314. As an example, if the design is an integrated circuit design, the design database may include physical layout information, and the graphics file may include two-dimensional image information of a top view of the integrated circuit. To create the graphics file, the user at web client 310 selects a window on its display screen, and clicks on an appropriate menu button presented by the snapshot program 316 on the display screen. The snapshot program 316 then captures the pixel information in the selected window from a frame buffer in the web client 310, converts the pixel information into a selected graphics file format, and transmits the graphics file to the web server 10. The web server 10 then transmits the graphics file upon request to all participating web clients 310, 320, 330 in the design conference so as to be viewable as a graphics image through graphics file readers in or invoked by the web browsers 312, 322, 332. Transmission of the graphics file to web clients 310, 320, 330 can be by specific download requests from the web clients 310, 320, 330, or through requests automatically generated by java applets 318, 328, 338 residing on the web clients 310, 320, 330.

By transmitting the design information through graphics files in this fashion, the information can be conveniently viewed through conventional web browsers independent of platform. Further, to view the graphics image, no special applications program is necessary, only graphics file readers already available with most web browsers. Finally, the graphics file format significantly compresses the data to be transmitted, making transmission quick and easy.

Each web client participating in the design conference receives its respective copy 318, 328, 338 of the java applet 16 from the web server 10 at the time it is admitted to the interactive design conference 30. The java applets 318, 328, 338 work with their respective client web browsers 312, 322, 332 to perform several useful functions. For example, they automatically refresh the graphics image by periodically requesting downloads from the web server 10. They also facilitate users of web clients 310, 320, 330 in making annotations of the graphics image, and transmitting the annotations back to the web server 10 for retransmission to other web clients. They also facilitate users of web clients 310, 320, 330 in transmitting messages back and forth to each other over the Internet 20 through the web server 10.

Figure 3:
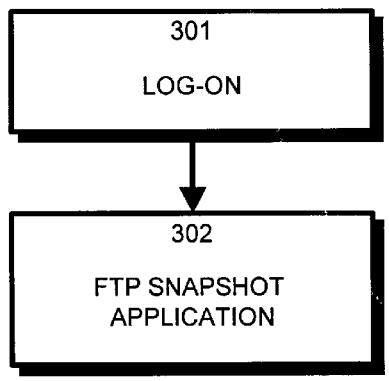
FIG. 3 illustrates a flow diagram of a portion of a method for conducting an interactive design conference over the Internet, including setting up an initiator of the design conference.

FIG. 3 illustrates a flow diagram of a portion of a method for conducting an interactive design conference over the Internet, including setting up the initiator of the design conference. In 301, the user at web client 310 (the initiator) contacts web server 10 by addressing its URL, and logs-on in a conventional fashion by providing a username and password when prompted. The web server 10 is programmed to check whether the username and password provided by the web client 310 is registered in a database of registered users. If it is not, then the web server 10 is programmed to transmit an appropriate error message back to the web client 310. On the other hand, if it is, then the web server 10 is programmed to transmit a welcome page back to the web client 310, in HTML so that it may be interpreted by the web browser 312 and displayed on the user's display screen. From the welcome page, in 302, the user then downloads the copy 316 of the snapshot program 14 from the web server 10, in a version suitable for the system environment (e.g., operating system and CPU type) of web client 310. Preferably, the download of the snapshot program uses FTP (File Transfer Protocol).

Figure 4:
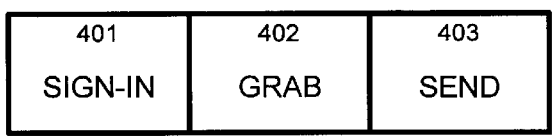
FIG. 4 illustrates an example of a menu provided to the initiator of the design conference before the initiator sets up the design conference.
Figure 5:
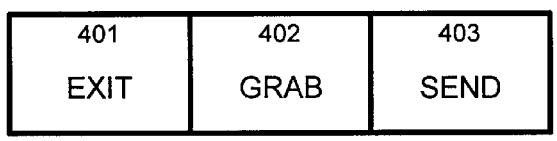
FIG. 5 illustrates an example of a menu provided to the initiator of the design conference after the initiator sets up the design conference.

FIG. 4 illustrates an example of a menu displayed on the web client 310 by the snapshot program 316 after the snapshot program 316 is initiated by the user of web client 310 through a conventional run program command, and FIG. 5 illustrates an example of the menu displayed on the web client 310 after the design conference is initiated. Before the design conference is initiated, button 401 functions to initiate a sign-in procedure as described in reference to FIG. 6, when clicked by the initiator. After the design conference is initiated, button 401 functions to initiate an initiator log-out procedure as described in reference to FIG. 13, when clicked by the initiator. Buttons 402 and 403 are used after the design conference is initiated to respectively take a snapshot of a window displayed on the display screen of web client 310, and transmit a graphics file containing image information of that window to web clients participating in the design conference. To send images to other participants, the initiator simply clicks on the grab button 402, then clicks on the window whose image is to be sent, then clicks on the send button 403.

Figure 6:
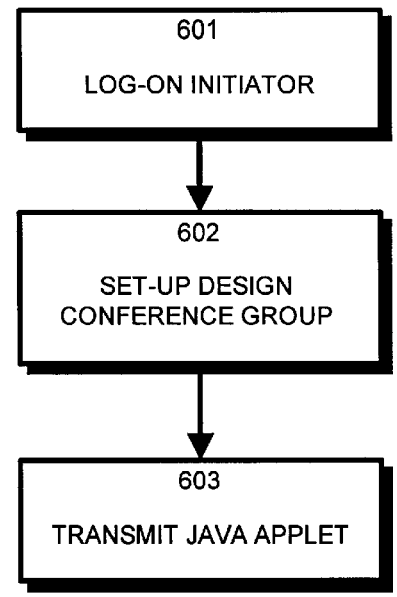
FIG. 6 illustrates a flow diagram of a portion of a method for conducting an interactive design conference over the Internet, including the initiator setting up the design conference.

FIG. 6 illustrates a flow diagram of a portion of a method for conducting an interactive design conference over the Internet, including the initiator setting up the design conference. In 601, the user of web client 310 logs-on by clicking the sign-in button 401, and proceeding as described in reference to 301 of FIG. 3. In 602, the web server 10 is programmed to initiate the design conference by first setting up a design conference group. The preferred method of doing 602 is by assigning a conference identification number to the design conference, and reserving memory space for a list of attendees starting with the initiator (user of web client 310), and including other participants (users of web clients 320, 330) after being admitted to the design conference by providing the conference identification number to the web server 10. Alternatively, 602 may be performed by the initiator first providing a list of authorized attendees (e.g., by username and/or password), and reserving memory space for a list of attendees starting with the initiator, and including other participants after being admitted to the design conference by the web server 10 verifying that such other participants are on the initiator's list of authorized attendees. In 603, the copy 318 of the java applet 16 is transmitted to the web client 310 along with a design conference application page for the design conference 30.

Figure 7:
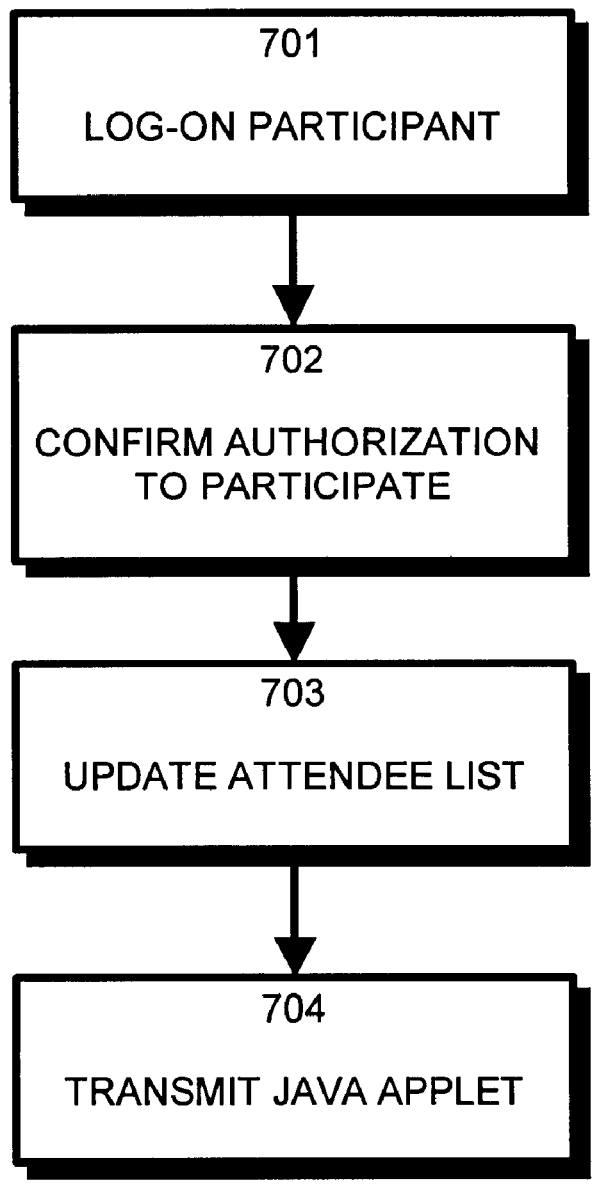
FIG. 7 illustrates a flow diagram of a portion of a method for conducting an interactive design conference over the Internet, including selectively admitting clients to the design conference.

FIG. 7 illustrates a flow diagram of a portion of a method for conducting an interactive design conference over the Internet, including selectively admitting clients to the design conference after initiated by the initiator. In 701, the users at web clients 320, 330 (other participants) first contact web server 10 by addressing its URL, then log-on. In the preferred method described in reference to 602, the other design conference participants log-on by providing the previously assigned conference identification number for the design conference 30. In the alternative method described in reference to 602, the other design conference participants merely identify themselves by providing, for example, their username and password. In 702, the web server 10 is programmed to confirm that each participant logging on is authorized to participate in the design conference 30. In the preferred method described in reference to 602, such confirmation merely requires that the conference identification number provided by the participant matches the conference identification number previously provided to the initiator and assigned to the design conference 30. In the alternative method described in reference to 602, confirmation requires that the identity of each participant matches that previously provided by the initiator.

After confirming authorization of the other design conference participants to participate in the design conference 30, in 703, the web server 10 is programmed to update the attendee list by adding the identity of the participant and the URL of the participant's web client to the attendee list. In 704, a copy of the java applet 16 is preferably transmitted to the newly admitted participant's web client, along with the design conference application page for the design conference 30.

Figure 8:
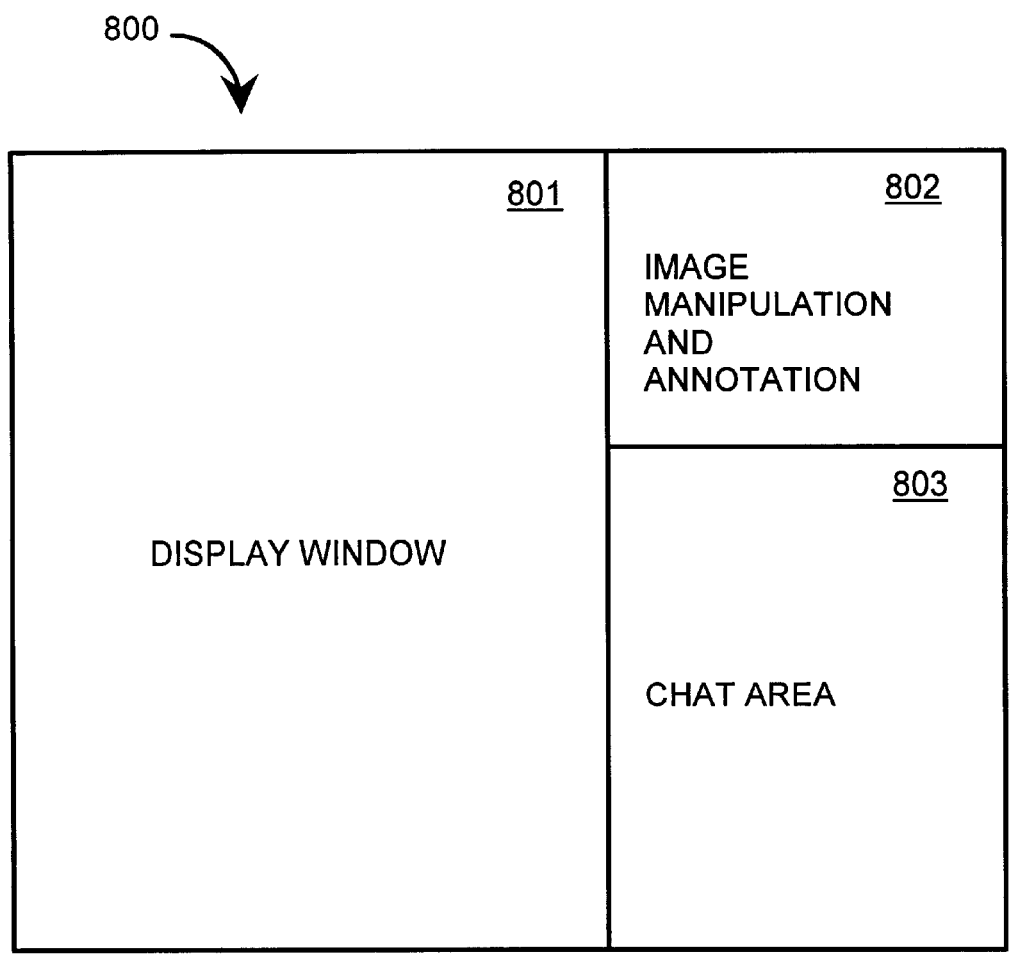
FIG. 8 illustrates design conference application page displayed by a web browser after a participant joins a design conference.

FIG. 8 illustrates an example of a design conference application page 800 transmitted to web clients 310, 320, 330, and displayed by their respective web browsers 312, 322, 332 after their respective users join the design conference 30. The application page 800 has two major areas. A display window 801 is reserved for displaying the graphics image provided by the initiator as described in reference to FIG. 9. A right menu frame 802, 803 includes a top portion 802 for image manipulation and annotation, and a bottom portion 803 for a Chat area. Graphics image manipulation functions include Pan and Zoom. Annotation is facilitated by the use of provided Markers that can be of selectable styles, such as alphanumeric, a line, a circle or oval, or a square or rectangle, and selectable colors. Typically, each web client uses a different color to quickly indicate the source of the annotation. The Chat area functions like a conventional chat facility where messages can be typed and transmitted to other web clients, or received from other web clients and displayed.

Figure 9:
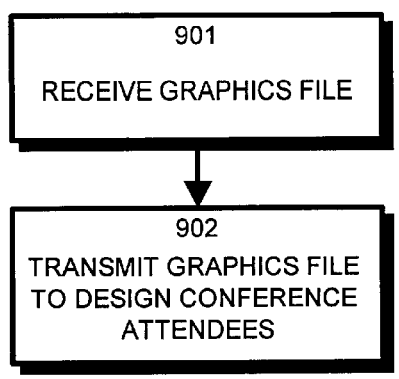
FIG. 9 illustrates a flow diagram of another portion of a method for conducting an interactive design conference over the Internet, including receiving and transmitting a graphics file to clients.

FIG. 9 illustrates a flow diagram of another portion of a method for conducting an interactive design conference over the Internet, including receiving and transmitting a graphics file to clients. In 901, the web server 10 is programmed to receive a graphics file from the initiator web client 310, and in 902, transmit the graphics file to all web clients 310, 320, 330 participating in the design conference 30 so as to be viewable as a graphics image through graphics file readers in or invoked by web browsers 312, 322, 332. The received graphics file may be in any one of a number of common graphics file formats such as JPEG, GIF or TIF.

Figure 10:
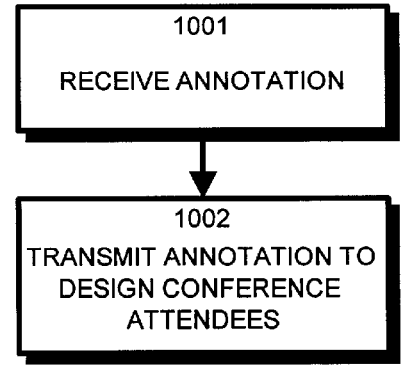
FIG. 10 illustrates a flow diagram of another portion of a method for conducting an interactive design conference over the Internet, including receiving and transmitting an annotation of the graphics file to clients.

FIG. 10 illustrates a flow diagram of another portion of a method for conducting an interactive design conference over the Internet, including receiving and transmitting an annotation of the graphics file to clients. In 1001, the web server 10 is programmed to receive an annotation of the graphics file from any of the web clients 310, 320, 330, and in 1002, transmit the annotation to all participating clients 310, 320, 330 so as to be viewable as an overlay over the graphics image. The received annotation or Marker may be in any one of a number of styles and colors provided in the image manipulation and annotation area 802 of the design conference application page 800.

Figure 11:
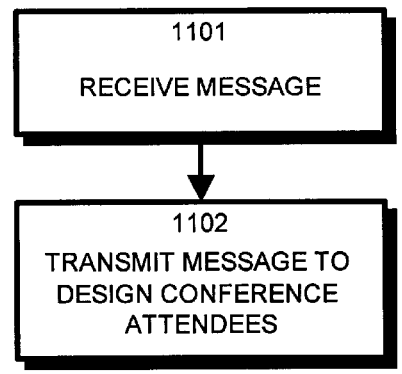
FIG. 11 illustrates a flow diagram of another portion of a method for conducting an interactive design conference over the Internet, including receiving and transmitting a message to clients.

FIG. 11 illustrates a flow diagram of another portion of a method for conducting an interactive design conference over the Internet, including receiving and transmitting a message to clients. In 1101, the web server 10 is programmed to receive a message from any of the web clients 310, 320, 330, and in 1102, transmit the message to all participating clients 310, 320, 330 so as to be readable in an area adjacent to the graphics image. Operation and feel of the messaging system is preferably a chat room type environment utilizing the Chat area 803 of the design conference application page 800.

Figure 12:
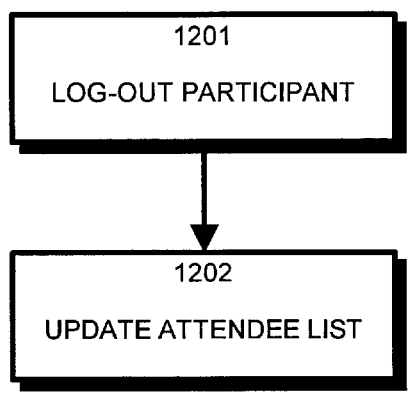
FIG. 12 illustrates a flow diagram of another portion of a method for conducting an interactive design conference over the Internet, including logging out participants from the design conference.

FIG. 12 illustrates a flow diagram of another portion of a method for conducting an interactive design conference over the Internet, including logging out participants from the design conference. In 1201, the web server 10 is programmed to recognize a log-out request received from one of the design conference participants using web clients 320, 330, after the participant logs off in a conventional manner by clicking on a Log-off or Exit button located on the design conference application page 800. In 1202, the web server 10 then updates the attendee list by deleting the participant logging off the design conference 30 from the attendee list.

Figure 13:
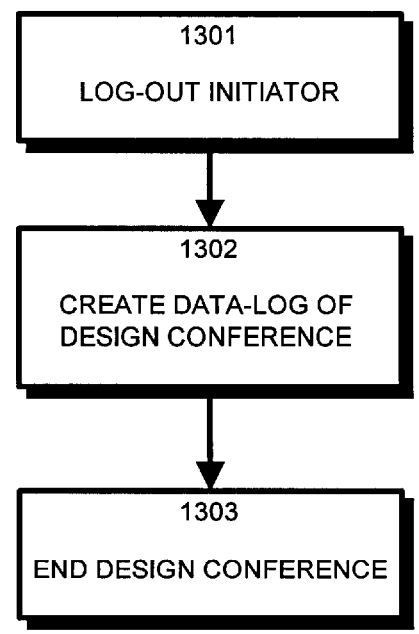
FIG. 13 illustrates a flow diagram of another portion of a method for conducting an interactive design conference over the Internet, including logging out the initiator of the design conference after creating a data-log of the design conference.

FIG. 13 illustrates a flow diagram of another portion of a method for conducting an interactive design conference over the Internet, including logging out the initiator of the design conference after creating a data-log of the design conference. In 1301, the web server 10 is programmed to recognize a log-out request received from the initiator of the design conference using web client 310 after the initiator logs off in a conventional manner by clicking on a Log-off or Exit button 401 of a menu adjacent to the design conference application page 800. In 1302, the web server 10 then creates a data-log of the design conference 30 for future reference, and in 1303, updates the attendee list by deleting the initiator of the design conference 30 from the attendee list.

FIGS. 3, 6 and 8 describe a preferred method for conducting an interactive design conference over the Internet, including transmitting a copy 316 of the snapshot program 14 and a copy 318 of the java applet 16 from the web server 10 to the initiator web client 310. Alternatively, the functions of the snapshot program 14, the java applet 16, and even the web browser 312, may be included in a "wrap-around" program that may stand alone and cooperate with a design application program that generates the graphics image, or be an integral part of or integrated into the design application program.

Although the various aspects of the present invention have been described with respect to a preferred embodiment, it will be understood that the invention is entitled to full protection within the full scope of the appended claims.

We claim:

1. A method of conducting an interactive design conference over the Internet, comprising:

selectively admitting a plurality of clients communicating through web browsers over the Internet to an interactive design conference according to criteria established upon initiation of said interactive design conference;

receiving a graphics file indicative of a design from one of said plurality of clients; and transmitting said graphics file to said plurality of clients so as to be viewable as a graphics image through graphics file readers in said web browsers.

2. The method according to claim 1, wherein said receiving a graphics file comprises receiving a JPEG file.

3. The method according to claim 1, wherein said receiving a graphics file comprises receiving a GIF file.

4. The method according to claim 1, wherein said receiving a graphics file comprises receiving a TIF file.

5. The method according to claim 1, further comprising transmitting a snapshot program to one of said plurality of clients, and said receiving a graphics file comprises receiving a graphics file generated by said snapshot program from said one of said plurality of clients.

6. The method according to claim 1, further comprising transmitting a java applet to each of said plurality of clients to run in said web browsers, and said transmitting said graphics file comprises transmitting said graphics file to said plurality of clients in response to said java applets so as to be viewable as a graphics image through graphics file readers in said web browsers.

7. The method according to claim 1, further comprising:

receiving an annotation of said graphics image from one of said plurality of clients; and transmitting said annotation to said plurality of clients so as to be viewable as an overlay over said graphics image.

8. The method according to claim 7, further comprising transmitting a java applet facilitating annotation of said graphics file to each of said plurality of clients to run in said web browsers.

9. The method according to claim 1, further comprising:

receiving a message from one of said plurality of clients; and transmitting said message to said plurality of clients so as to be viewable in an area adjacent to said graphics image.

10. The method according to claim 1, wherein said selectively admitting comprises:

assigning a conference identification number to said interactive design conference; and admitting each of said plurality of clients to said interactive design conference only after receiving said conference identification number from said client.

11. The method according to claim 10, further comprising updating an attendee list to include each of said plurality of clients admitted to said interactive design conference.

12. The method according to claim 11, further comprising updating said attendee list to delete each of said plurality of clients logging off said interactive design conference.

13. The method according to claim 1, wherein said selectively admitting comprises:

receiving a list of authorized participants to said interactive design conference; and admitting each of said plurality of clients to said interactive design conference only after confirming that said client is on said list of authorized participants.

14. A method of conducting an interactive design conference over the Internet, comprising:

establishing a design conference including a plurality of clients communicating through web browsers over the Internet according to criteria established upon initiation of said interactive design conference;

receiving a graphics file indicative of a design from one of said plurality of clients; and transmitting said graphics file to said plurality of clients so as to be viewable as a graphics image through graphics file readers in or invoked by said web browsers.

15. The method according to claim 14, further comprising transmitting a snapshot program to one of said plurality of clients, and said receiving a graphics file comprises receiving a graphics file generated by said snapshot program from said one of said plurality of clients.

16. The method according to claim 14, further comprising transmitting a java applet to each of said plurality of clients to run in said web browsers, and said transmitting said graphics file comprises transmitting said graphics file to said plurality of clients in response to said java applets so as to be viewable as a graphics image through graphics file readers in or invoked by said web browsers.

17. The method according to claim 14, further comprising:

receiving an annotation of said graphics image from one of said plurality of clients; and transmitting said annotation to said plurality of clients so as to be viewable as an overlay over said graphics image.

18. The method according to claim 17, further comprising transmitting a java applet facilitating annotation of said graphics file to each of said plurality of clients to run in said web browsers.

19. An apparatus for conducting an interactive design conference over the Internet, comprises a web server programmed to establish a design conference including a plurality of clients communicating through web browsers over the Internet according to criteria established upon initiation of said interactive design conference; receive a graphics file indicative of a design from one of said plurality of clients; and transmit said graphics file to said plurality of clients so as to be viewable as a graphics image through graphics file readers in or invoked by said web browsers.

20. The apparatus according to claim 19, wherein said web server is further programmed to transmit a snapshot program to one of said plurality of clients to facilitate generation of said graphics file by said client, and a java applet to each of said plurality of clients to facilitate annotation of said graphics file by said clients.

21. An apparatus for conducting an interactive application conference over the Internet, comprising a web client configured with an application page defining a display area for displaying a graphics image indicative of an application, and an annotation area for generating annotations of said graphics image; a snapshot program to generate upon command a graphics file corresponding to said graphics image, and transmit upon command said graphics file to a web server for retransmission over the Internet to other participants selectively admitted to said interactive application conference according to criteria established upon initiation of said interactive application conference and communicating through web browsers so as to translate said graphics file back into and display said graphics image; and a module to generate upon command annotations of said graphics image and transmit said annotations to said web server for retransmission over the Internet to said other participants configured with java applets cooperating with said web browsers so as to display said annotations over said graphics image.

22. The apparatus according to claim 21, wherein said web client is further configured with an application program to generate said graphics image, and said application page, said snapshot program, and said module are included in a wrap-around program integrated with said application program.

* * * * *